(12) United States Patent
Durco

(10) Patent No.: US 12,044,689 B2
(45) Date of Patent: Jul. 23, 2024

(54) SAMPLE CONTAINER CARRIER, LABORATORY SAMPLE DISTRIBUTION SYSTEM AND LABORATORY AUTOMATION SYSTEM

(71) Applicant: Roche Diagnostics Operations, Inc., Indianapolis, IN (US)

(72) Inventor: Rudolf Durco, Kornwestheim (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 278 days.

(21) Appl. No.: 16/714,907

(22) Filed: Dec. 16, 2019

(65) Prior Publication Data
US 2020/0200783 A1 Jun. 25, 2020

(30) Foreign Application Priority Data

Dec. 21, 2018 (EP) ..................................... 18215139

(51) Int. Cl.
*G01N 35/04* (2006.01)
*B01L 9/00* (2006.01)
(Continued)

(52) U.S. Cl.
CPC ................ *G01N 35/04* (2013.01); *B01L 9/06* (2013.01); *B01L 9/50* (2013.01); *A47G 23/02* (2013.01);
(Continued)

(58) Field of Classification Search
CPC ................... G01N 35/04; G01N 35/00; G01N 2035/0415; G01N 2035/0477;
(Continued)

(56) References Cited

U.S. PATENT DOCUMENTS 5,154,380 A  10/1992  Risca
5,941,366 A * 8/1999  Quinlan ............... B65G 17/002
                                                              198/465.1

(Continued)

FOREIGN PATENT DOCUMENTS

| EP | 3025974 A1 | 6/2016 |
|---|---|---|
| JP | 2298015 A | 12/1990 |
| JP | H-02298015 A | * 12/1990 |
| JP | 2009-214204 A | 9/2009 |
| WO | 2016/025606 A1 | 2/2016 |

OTHER PUBLICATIONS

European Search Report issued Jun. 5, 2019, in Application No. EP 18215139.9, 2 pp.

*Primary Examiner* — P. Kathryn Wright
*Assistant Examiner* — Curtis A Thompson
(74) *Attorney, Agent, or Firm* — Thomas E. Lees, LLC

(57) ABSTRACT

A sample container carrier for holding a laboratory sample container and for transporting the held laboratory sample container in a laboratory sample distribution system is presented. The sample container carrier comprises a first holding element and a second holding element. The first holding element and the second holding element are rotationally displaceable towards and/or away from each other for holding the laboratory sample container. The sample container carrier comprises a coupler. The coupler is connected to the first holding element and to the second holding element such that the coupler couples rotational displacements of the first holding element and the second holding element with each other. The coupler comprises a ring-segment shape for inserting the laboratory sample container to be held by the coupler.

16 Claims, 4 Drawing Sheets

(51) Int. Cl.
*B01L 9/06* (2006.01)
*A47G 23/02* (2006.01)
*B65G 29/00* (2006.01)
*B67C 3/24* (2006.01)
*G01N 35/00* (2006.01)

(52) U.S. Cl.
CPC ......... *B01L 9/00* (2013.01); *B01L 2300/0803* (2013.01); *B65G 29/00* (2013.01); *B67C 3/24* (2013.01); *G01N 35/00* (2013.01); *G01N 2035/0415* (2013.01); *G01N 2035/0477* (2013.01)

(58) Field of Classification Search
CPC ..... G01N 2035/0406; B01L 9/06; B01L 9/50; B01L 9/00; B01L 2300/0803; B67C 3/24; B65G 29/00; B65G 54/02; B65G 2201/0261; A47G 23/02
See application file for complete search history.

(56) References Cited

U.S. PATENT DOCUMENTS

| | | | |
|---|---|---|---|
| 8,147,778 B2 | 4/2012 | Pedrazzini | |
| 2005/0037502 A1* | 2/2005 | Miller | G01N 35/0092 436/43 |
| 2005/0180896 A1* | 8/2005 | Itoh | B01L 9/06 422/400 |
| 2006/0104862 A1* | 5/2006 | Pages Pinyol | G01N 35/025 422/64 |
| 2010/0015007 A1* | 1/2010 | Pedrazzini | B01L 9/06 422/64 |
| 2014/0231217 A1* | 8/2014 | Denninger | B65G 43/00 198/358 |
| 2017/0131310 A1* | 5/2017 | Volz | G01N 35/04 |
| 2017/0248624 A1* | 8/2017 | Kaeppeli | B01L 9/06 |
| 2019/0076845 A1* | 3/2019 | Huber | B65G 54/025 |
| 2019/0076846 A1* | 3/2019 | Durco | B01L 9/06 |
| 2020/0209270 A1* | 7/2020 | Kaeppeli | G01N 35/04 |

* cited by examiner

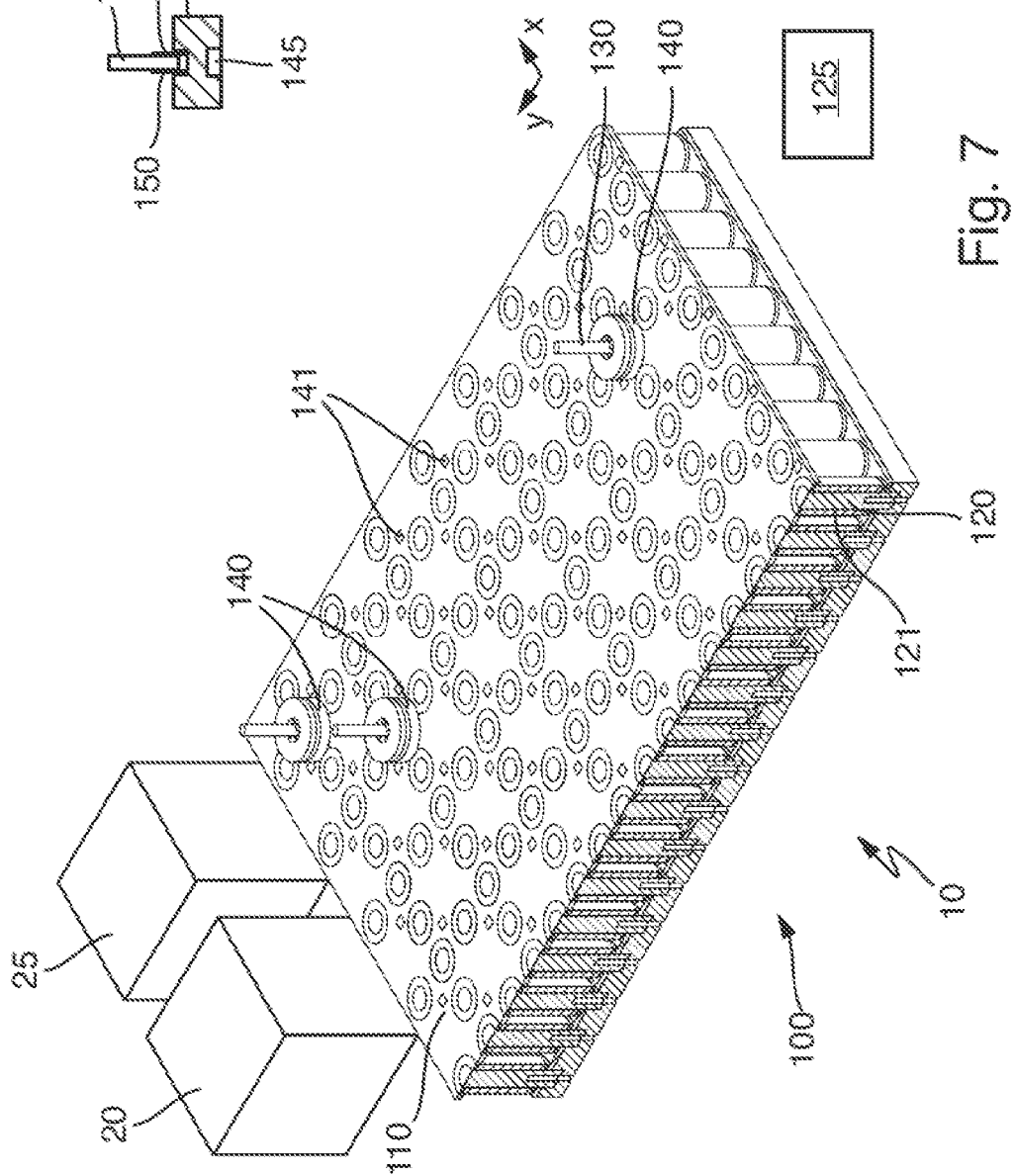

SAMPLE CONTAINER CARRIER, LABORATORY SAMPLE DISTRIBUTION SYSTEM AND LABORATORY AUTOMATION SYSTEM

CROSS-REFERENCE TO RELATED APPLICATIONS

This application claims priority to EP 18215139.9, filed Dec. 21, 2018, which is hereby incorporated by reference.

BACKGROUND

The present disclosure generally relates to a sample container carrier, a laboratory sample distribution system comprising such a sample container carrier and a laboratory automation system comprising such a laboratory sample distribution system.

Known laboratory sample distribution systems are typically used in laboratory automation systems in order to distribute laboratory samples contained in laboratory sample containers between different laboratory stations by means of sample container carriers.

However, there is a need for a sample container carrier having improved holding properties.

SUMMARY

According to the present disclosure, a sample container carrier for holding a laboratory sample container and for transporting the held laboratory sample container in a laboratory sample distribution system is presented. The sample container carrier can comprise a first holding element and a second holding element. The first holding element and the second holding element can be rotationally displaceable towards and/or away from each other for holding the laboratory sample container. The sample container carrier can also comprise a coupler. The coupler can be connected to the first holding element and to the second holding element such that the coupler couples rotational displacements of the first holding element and the second holding element with each other. The coupler can comprise a ring-segment shape for inserting the laboratory sample container to be held into the coupler.

Accordingly, it is a feature of the embodiments of the present disclosure to provide for a sample container carrier having improved holding properties. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 7 illustrates a perspective view of a laboratory automation system according to the invention comprising the sample container carrier of FIG. 1 holding a laboratory sample container according to an embodiment of the present disclosure.

FIG. 8 illustrates a schematic cross section view of the sample container carrier of FIG. 1 holding the laboratory sample container according to an embodiment of the present disclosure.

DETAILED DESCRIPTION

Figure 1:
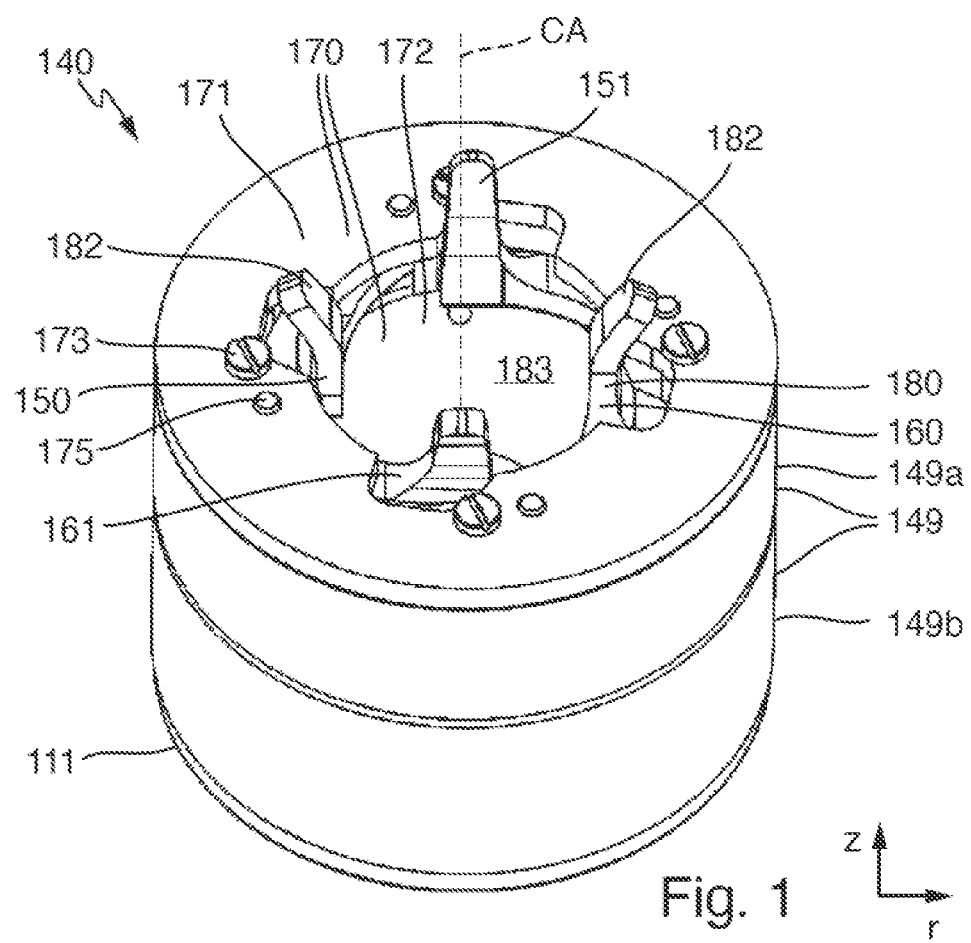
FIG. 1 illustrates a perspective view of a sample container carrier according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A sample container carrier for holding a laboratory sample container and for transporting the held laboratory sample container in a laboratory sample distribution system is disclosed. The sample container carrier can comprise a first holding element and a second holding element. The first holding element and the second holding element can be rotationally displaceable, or pivotable, respectively, towards and/or away from each other for holding the laboratory sample container. Furthermore, the sample container carrier can comprise a coupler. The coupler can be connected such as, for example, directly and/or mechanically connected, to the first holding element and to the second holding element such that the coupler can couple rotational displacements of the first holding element and the second holding element with each other. Moreover, the coupler can comprise a ring-segment or annular, respectively, shape for inserting the laboratory sample container to be held into the coupler.

In one embodiment, the laboratory sample container may be designed as a tube made of glass or transparent plastic and may have an opening at an upper end. Additionally, or alternatively, the laboratory sample container may be used to contain, store and transport a laboratory sample such as a blood sample, a urine sample or a chemical sample.

The sample container carrier may comprise only, or exactly, the two holding elements, namely the first holding element and the second holding element. Alternatively, the sample container carrier may comprise a third holding element, or additionally, a fourth holding element, or even more holding elements. All of the holding elements may be rotationally displaceable towards and/or away from each other for holding the laboratory sample container. The coupler may be connected to all of the holding elements such that the coupler may couple rotational displacements of all of the holding elements with each other. Additionally, or alternatively, at least one, and in some embodiments, all, of the holding elements may be, and in one embodiment, only, rotationally displaceable towards and/or away from each other for holding the laboratory sample container. In other words, at least one, and in some embodiments all, of the holding elements may not be or does/do not have to be translationally displaceable towards and/or away from each other for holding the laboratory sample container. Additionally, or alternatively, at least one, and in some embodiments all, of the holding elements, may be, and in some embodiments only, horizontally displaceable such as, for example, substantially orthogonal to a central axis of the sample container carrier. In other words, at least one, and in some embodiments all, of the holding elements may not be or does/do not have to be vertically displaceable such as, for example, along the central axis.

The first holding element and/or the second holding element may be configured to be in direct contact with the laboratory sample container for holding the laboratory sample container. Additionally, or alternatively, the held laboratory sample container may be at least partially positioned between the first holding element and the second holding element. Additionally, or alternatively, the first holding element and the second holding element may be arranged in a, and in some embodiments, symmetric, manner around a center and/or the central axis of the sample container carrier such that a point or line of contact, i.e. holding, of each of the first holding element and the second holding element with the laboratory sample container can be substantially equidistant from the center and/or from the central axis of the sample container carrier. In one embodiment, the center may be located on the central axis. Additionally, or alternatively, the center may be a center of gravity of the sample container carrier. Additionally, or alternatively, the central axis may be a symmetry axis of the, in particular held, sample container carrier such as, for example, a longitudinal and/or a vertical axis. In other words, the held laboratory sample container may be centralized by the first holding element and the second holding element into the center of the sample container carrier. Additionally, or alternatively, the laboratory sample container may comprise a circumference, wherein the first holding element and/or the second holding element may hold the laboratory sample container at its circumference. Additionally, or alternatively, the held laboratory sample container may be held by the first holding element and/or the second holding element in an upright position or such that the opening of the laboratory sample container, if present, may be facing away from the sample container carrier such as, for example, to prevent spillage out of the laboratory sample container, if open. Additionally, or alternatively, the first holding element and/or the second holding element may be rotationally moveable or rotatable, respectively, around a respective decentral axis such as, for example, being different from and/or substantially parallel to the central axis. In one embodiment, the decentral axes may be arranged such as, for example, in a symmetric, manner around and/or substantially equidistant to the central axis and/or the center.

The coupler may be a mechanical coupler. In one embodiment, the coupler may be a rigid coupler. Additionally, or alternatively, the coupler may be configured to perform a movement when the first holding element and/or the second holding element may be rotationally displaced. Additionally, or alternatively, the coupler may be configured to transfer a rotational displacement of the first holding element into a rotational displacement of the second holding element. Additionally, or alternatively, the coupler may be configured to transfer a rotational displacement of the second holding element into a rotational displacement of the first holding element.

The sample container carrier can enable a synchronization of the rotational displacements of the first holding element and the second holding element. This may enable holding the laboratory sample container in a defined holding position such as, for example, independent from a type and/or a size of the laboratory sample container. Furthermore, this may enable each of the first holding element and the second holding element to apply a similar, or identical, holding force value to the laboratory sample container. Thereby, balanced forces may be provided. Moreover, the ring-segment shape of the coupler can enable a relatively compact construction design such as, for example, a relatively low construction height, of the sample container carrier.

In one embodiment, the held laboratory sample container may be at least partially positioned in the coupler. In other words, the coupler may surround the held laboratory sample container. Additionally, or alternatively, the coupler may comprise, and, in some embodiments, be, an open ring or a closed ring. Additionally, or alternatively, the coupler may comprise, and, in one embodiment have, a substantially circular shape. Additionally, or alternatively, the coupler may be arranged in a, and in some embodiments symmetric, manner around the center and/or the central axis of the sample container carrier such that the coupler is substantially equidistant from the center and/or from the central axis of the sample container carrier.

According to an embodiment, the coupler can be rotationally moveable or rotatable or pivotable, respectively such that the coupler can couple by its rotational movement or rotation, respectively, the rotational displacements of the first holding element and the second holding element with each other. In one embodiment, the coupler may be only rotationally moveable. In other words, the coupler may not or does not have to perform a translational movement. Additionally, or alternatively, the coupler may be rotationally moveable around the center and/or the central axis of the sample container carrier. Additionally, or alternatively, the coupler may be configured to perform a rotational movement, when the first holding element and/or the second holding element may be rotationally displaced. Additionally, or alternatively, the sample container carrier may comprise a base body, wherein the coupler may be rotationally moveable mounted to the base body.

According to an embodiment, the sample container carrier can comprise a base body. The coupler can be rotationally moveable or rotatable or pivotable, respectively, and in some embodiments translationally fixed, mounted to the base body.

Furthermore, the first holding element and/or the second holding element can be rotationally moveable or rotatable or pivotable, respectively, and translationally fixed mounted or linked, respectively, to the coupler such as, for example, by a hinge, and rotationally moveable or rotatable or pivotable, respectively, and translationally moveable guided such as, for example, restraint-guided, mounted to the base body.

Additionally, or alternatively, the first holding element and/or the second holding element can be rotationally moveable or rotatable or pivotable, respectively, and translationally fixed mounted or linked, respectively, to the base body such as, for example, by a hinge, and rotationally moveable or rotatable or pivotable, respectively, and translationally moveable guided such as, for example, restraint-guided, mounted to the coupler.

This can enable coupling of the rotational displacements of the first holding element and the second holding element by the coupler.

In one embodiment, the base body may comprise, in particular have, a cylindrical and/or circular shape.

The coupler may be only rotationally moveable. In other words, the coupler may not or does not have to perform a translational movement. Additionally, or alternatively, the coupler may be rotationally moveable around the center and/or the central axis of the sample container carrier.

The first holding element and/or the second holding element may be mounted to the coupler and/or to the base body by a number of pins. In one embodiment, the first holding element and/or the second holding element, and in one embodiment each, may be mounted to the coupler by a pin and to the base body by another pin. In one embodiment, a distance between the pin and the another pin may be constant or unchangeable, respectively. Additionally, or alternatively, the first holding element and/or the second holding element may be rotationally moveable or rotatable, respectively, around and/or by the respective pin or the respective another pin. In other words, the pin or the another pin may define the decentral axis. In one embodiment, the pins and/or the another pins may be arranged in a symmetric manner around and/or substantially equidistant to the central axis and/or the center.

According to an embodiment, the first holding element and/or the second holding element, the base body and/or the coupler can comprise a number of guiding grooves. The number of guiding grooves can be configured to guide the translational movements of the first holding element and/or the second holding element. In one embodiment, the number of pins, if present, may be configured to cooperate together with the number of guiding grooves for the translational movement. In one embodiment, the number of pins may be partially arranged, in particular, translationally moveable guided arranged, within or inside the number of guiding grooves. Additionally, or alternatively, the number of pins and the number of guiding grooves may cooperate together such that, when the first holding element and/or the second holding element may be rotationally displaced, the coupler may be rotationally moved or rotated. Additionally, or alternatively, the number of pins and the number of guiding grooves may cooperate together such that, when the coupler may be rotationally moved or rotated the first holding element and/or the second holding element may be rotationally displaced. In one embodiment, the number of pins may translationally move in the number of guiding grooves guided by the number of guiding grooves, when the first holding element and/or the second holding element may be rotationally displaced and/or the coupler may be rotationally moved or rotated. Additionally, or alternatively, a direction, in particular of each, of the number of guiding grooves may be substantially orthogonal to a rotational movement direction or rotation direction, respectively, of the coupler and/or to the central axis and/or radially towards the center and/or the central axis. In other words, a direction, in particular of each, of the number of guiding grooves may not be or does/do not have to be parallel to the central axis.

According to an embodiment, the sample container carrier can comprise a base body. The coupler can be, in particular rotationally, moveable or rotatable, respectively, mounted to the base body and the first holding element and/or the second holding element are/is, in particular rotationally, movable or rotatable, respectively, mounted to the base body and the coupler such that the first holding element and/or the seconding holding element, in particular each, form a lever arm.

This can enable the rotational displacements of the first holding element and the second holding element towards and/or away from each other for holding the laboratory sample container. Furthermore, the ring-segment shaped coupler may have a relatively large diameter enabling a relatively good force transfer enabling a relatively easy coupling.

According to an embodiment, the first holding element and/or the second holding element are/is mounted to the base body further, in particular radially, outward than to the coupler, in particular from the center and/or the central axis. This can enable a space-saving arrangement enabling a relatively compact construction design such as, for example, a relatively low diameter, of the sample container carrier.

According to an embodiment, the coupler can be tapered in an insertion direction for supporting the inserted laboratory sample container. In one embodiment, the coupler may be configured to be in direct contact with the laboratory sample container for supporting the inserted laboratory sample container. Additionally, or alternatively, the coupler may be arranged in a symmetric manner around the center and/or the central axis of the sample container carrier such that a point or line of contact, i.e., supporting, of the coupler with the laboratory sample container is substantially equidistant from the center and/or from the central axis of the sample container carrier. In other words, the held laboratory sample container may be centralized by the coupler into the center of the sample container carrier. Additionally, or alternatively, the held laboratory sample container such as, for example, an end face or a bottom of the laboratory sample container, may be supported by the coupler. Additionally, or alternatively, a part, and in some embodiments each, of the first holding element and the second holding element for holding the laboratory sample container may be arranged above such as, for example, along the central axis, of a part of the coupler for supporting the laboratory sample container.

According to an embodiment, the first holding element and/or the second holding element can comprise a number of jaws (e.g., 1 to 10) for holding the laboratory sample container. In one embodiment, each holding element may comprise only one jaw. Additionally, or alternatively, the number of jaws may be configured to be in direct contact with the laboratory sample container for holding the laboratory sample container. Additionally, or alternatively, each jaw may comprise or form a circular segment or section. Additionally, or alternatively, the number of jaws or longitudinal axis/axes such as, for example, each of the longitudinal axes, of the number of jaws, respectively, may be oriented substantially vertically and/or parallel to the center and/or the central axis. Additionally, or alternatively, the jaws may be distributed around the central axis in a substantially equidistant and/or equiangular manner. Additionally, or alternatively, the number of jaws may comprise a flexible and/or soft material for holding the laboratory sample container. This may enable a relatively reliable contact and/or a desired friction between the number of jaws and the laboratory sample container. In one embodiment, the first holding element and/or the second holding element may be a multi-component injection molding part, wherein the number of jaws may be made of a softer material such as, for example, a rubber-based-material. Additionally, or alternatively, the number of jaws may comprise a number of first jaws and a number of second jaws, wherein the first holding element and the number of first jaws may be formed in one-piece and/or the second holding element and the number of second jaws may be formed in one-piece. Additionally, or alternatively, at least one of the number of jaws may comprise a corrugation for holding the laboratory sample container. This may enable a relatively high friction and/or grip between the corrugated jaw and the laboratory sample container. In one embodiment, the corrugation may be a ribbing. Additionally, or alternatively, the corrugation may be configured not to destroy and/or to affect the laboratory sample container. Additionally, or alternatively, the jaws may be rotationally displaceable towards and/or away from each other.

According to an embodiment, the lever arm can comprise a curved shape. The jaw can be arranged at an end portion of the lever arm such that the lever arm is not in direct contact with the laboratory sample container when the laboratory sample container is inserted into, held by and/or removed from the sample container carrier. This can enable a desired friction such as, for example, a relatively low friction, between at least one of the holding elements and the laboratory sample container such as, for example, during the insertion or a removal of the laboratory sample container such that the laboratory sample container may only be a little or not be rotated during the insertion or the removal. In one embodiment, the curved shape may be in form of a segment of a circle. Additionally, or alternatively, the lever arm may be denoted as a flap.

According to an embodiment, the first holding element and/or the second holding element can comprise an insertion support. The insertion support can be configured to cooperate together with the laboratory sample container to be held such that the holding element comprising the insertion support can be rotationally displaced when the laboratory sample container is inserted into the sample container carrier such as, for example, into the coupler. This can enable a relatively simple insertion of the laboratory sample container to be held into the sample container carrier such as, for example, into the coupler. In one embodiment, the insertion support may be an inclined plane, inclined surface or inclined edge. Additionally, or alternatively, at least one respective jaw of the number of jaws, if present, may comprise the insertion support.

According to an embodiment, the sample container carrier can comprise a retaining element applying a force to the first holding element and/or to the second holding element and/or to the coupler such that the first holding element and the second holding element can be force-loaded towards each other for holding the laboratory sample container. This can enable a reliable holding of the laboratory sample container. Additionally, or alternatively, the retaining element may apply a force such that the first holding element and the second holding element may be rotationally displaced towards each other such as, for example, into a default position when the laboratory sample container may be removed from the sample container carrier. In one embodiment, the retaining element may comprise or be an elastic element. Additionally, or alternatively, the retaining element may comprise or be a spring, a rubber element, a rubber band, at least one magnet, a cable pull system, a pneumatic system or a hydraulic system. Additionally, or alternatively, the default position may be a position of the first holding element and the second holding element, wherein a distance between the first holding and the second holding element may be minimal. Additionally, or alternatively, the sample container carrier may comprise at least two retaining elements. This may enable a relatively long lifetime of the sample container carrier. In one embodiment, the sample container carrier may comprise a number of retaining elements, wherein the number of retaining elements may correspond to, in particular equal, the number of holding elements. Additionally, or alternatively, at least one retaining element may be arranged radially outward of the coupler from the center and/or the central axis. This may enable a relatively easy construction design.

According to an embodiment, the sample container carrier can comprise a stop element. The stop element can be configured to cooperate with the first holding element and/or the second holding element and/or the coupler such that the rotational displacements of the first holding element and the second holding element can be limited. In one embodiment, the rotational displacements of the first holding element and the second holding element towards each other may be limited by the stop element. In one embodiment, the stop element may define a default or relaxed position of the first holding element and/or the second holding element. In one embodiment, the default position may be a position of the first holding element and the second holding element, wherein a distance between the first holding and the second holding element may be minimal.

Additionally, or alternatively, the coupler may comprise a top part and a bottom part, wherein the top part may be arranged above along the central axis of the bottom part. The first holding element and/or the second holding element such as, for example, the lever arm, may be arranged in between the top part and the bottom part such as, for example, along the central axis, and may be mounted to the top part and to the bottom part.

According to an embodiment, the coupler can comprise an outside, or exterior, top cover. This can enable the repair the sample container carrier to be relatively easy such as, for example, when one of the holding elements needs a replacement such as, for example, only by removing the outside top cover. In one embodiment, the outside top cover may be rotationally moveable or rotatable, respectively, such that the outside top cover can couple by its rotational movement or rotation, respectively, the rotational displacements of the first holding element and the second holding element with each other. Additionally, or alternatively, the coupler may comprise a bottom part, wherein the outside top cover may be arranged above such as, for example, along the central axis, of the bottom part. The first holding element and/or the second holding element, such as, for example, the lever arm, may be arranged in between the outside top cover and the bottom part such as, for example, along the central axis, and may be mounted to the outside top cover and to the bottom part. In one embodiment, the bottom part may be tapered in the insertion direction for supporting the inserted laboratory sample container. Additionally, or alternatively, the outside top cover may not or does not have to be configured to support the inserted laboratory sample container. Additionally, or alternatively, the outside top cover may comprise a plate shape. Additionally, or alternatively, the outside top cover may form a top surface of the sample container carrier.

According to an embodiment, the sample container carrier can comprise a magnetically active element, wherein the magnetically active element can be configured to interact with a magnetic field generated by a drive element such that a driving force such as, for example, a magnetic driving force, can be applied to the sample container carrier. In one embodiment, the magnetically active element may be a permanent magnet or an electro-magnet. Additionally, or alternatively, the magnetically active element may comprise a magnetically soft material.

A laboratory sample distribution system is also presented. The laboratory sample distribution system can comprise a number of sample container carriers (e.g., 1 to 1000) as described above, a transport plane, a number of drive elements (e.g., 1 to 10000) and a control device. The transport plane can be configured to support the number of sample container carriers. The number of drive elements can be configured to move the number of sample container carriers on the transport plane. The control device can be configured to control the number of drive elements such that the number of sample container carriers can move on the transport plane along corresponding transport paths.

In one embodiment, the transport plane may also be denoted as transport surface. Additionally, or alternatively, the transport plane may support the sample container carriers, what may also be denoted as carrying the sample container carriers. Additionally, or alternatively, the sample container carriers may be translationally moved on the transport plane. Additionally, or alternatively, the sample container carriers may be configured to move in two dimensions on the transport plane. Additionally, or alternatively, the number of sample container carriers may slide over the transport plane. Additionally, or alternatively, the control device may be an integrated circuit, a tablet computer, a smartphone, a computer or a processing control system. Additionally, or alternatively, each of the sample container carriers may move on the transport plane along an individual transport path.

According to an embodiment, the number of drive elements can comprise a number of electro-magnetic actuators (e.g., 1 to 10000). The number of electro-magnetic actuators can be stationary arranged below the transport plane and can be configured to generate a magnetic field to move the number of sample container carriers on the transport plane. Each of the number of sample container carriers can comprise a magnetically active element. The magnetically active element can be configured to interact with the magnetic field generated by the number of electro-magnetic actuators such that a driving force such as, for example, a magnetic driving force, can be applied to the sample container carrier. The control device can be configured to control the number of electro-magnetic actuators such that the number of sample container carriers can move on the transport plane along corresponding transport paths. In one embodiment, the electro-magnetic actuators may be solenoids surrounding ferromagnetic cores. Additionally, or alternatively, the electro-magnetic actuators may be driven or energized individually in order to generate or to provide the magnetic field. Additionally, or alternatively, the electro-magnetic actuators may be arranged in two dimensions such as, for example, in a grid or matrix having rows and columns, along which the electro-magnetic actuators can be arranged. Additionally, or alternatively, the electro-magnetic actuators may be arranged in a plane substantially parallel to the transport plane.

A laboratory automation system is also presented. The laboratory automation system can comprise a number of laboratory stations (e.g., 1 to 50) and a laboratory sample distribution system as described above. The laboratory sample distribution system can be configured to distribute the number of sample container carriers and/or laboratory sample containers between the laboratory stations.

In one embodiment, the laboratory stations may be arranged adjacent or directly next to the laboratory sample distribution system such as, for example, to the transport plane of the laboratory sample distribution system. Additionally, or alternatively, the number of laboratory stations may comprise pre-analytical, analytical, and/or post-analytical laboratory stations. In one embodiment, pre-analytical laboratory stations may be configured to perform any kind of pre-processing of samples, sample containers and/or sample container carriers. Additionally, or alternatively, analytical laboratory stations may be configured to use a sample or part of the sample and a reagent to generate a measuring signal, the measuring signal indicating if and in which concentration, if any, an exists. Additionally, or alternatively, post-analytical laboratory stations may be configured to perform any kind of post-processing of samples, sample containers and/or sample container carriers. Additionally, or alternatively, the pre-analytical, analytical and/or post-analytical laboratory stations may comprise at least one of a decapping station, a recapping station, an aliquot station, a centrifugation station, an archiving station, a pipetting station, a sorting station, a tube type identification station, a sample quality determining station, an add-on buffer station, a liquid level detection station, a sealing/desealing station, a pushing station, a belt station, a conveying system station and/or a gripper station for moving the sample container to or from the sample container carrier.

FIGS. 1 to 8 show a sample container carrier 140 for holding a laboratory sample container 130 and for transporting the held laboratory sample container 130 in a laboratory sample distribution system 100. The sample container carrier 140 can comprise a first holding 150 element and a second holding element 160. The first holding element 150 and the second holding element 160 can be rotationally displaceable towards and/or away from each other for holding the laboratory sample container 130. Furthermore, the sample container carrier 140 can comprise a coupler 130. The coupler 170 can be connected to the first holding element 150 and to the second holding element 160 such that the coupler 170 can couple rotational displacements of the first holding element 150 and the second holding element 160 with each other. Moreover, the coupler 170 can comprise a ring-segment shape for inserting the laboratory sample container 130 to be held into the coupler 170.

Figure 2:
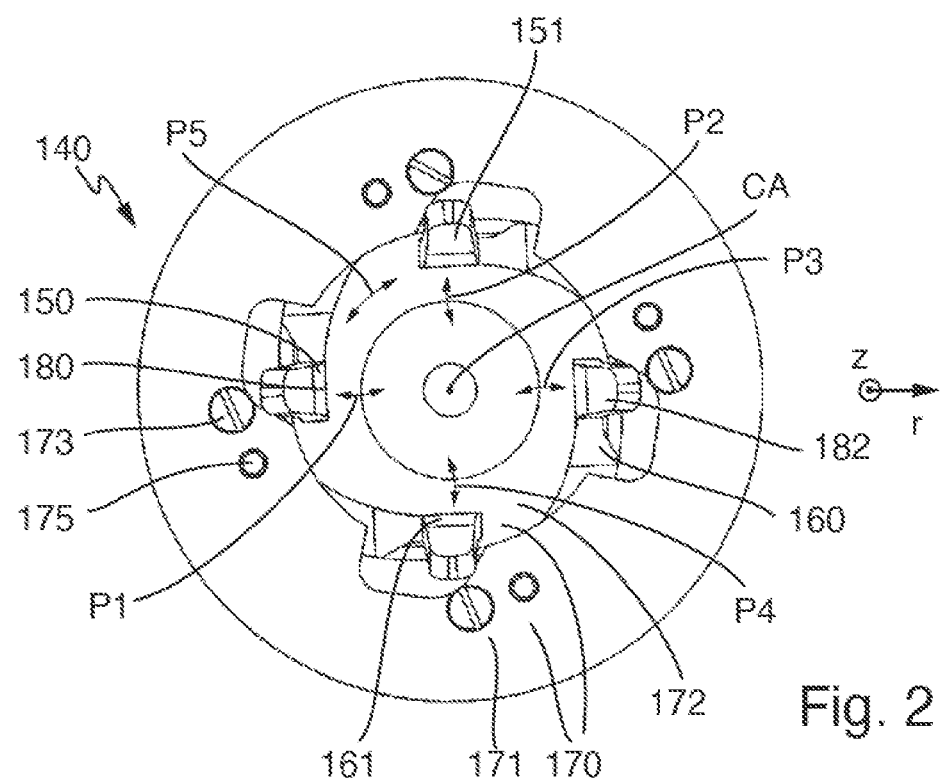
FIG. 2 illustrates a top view of the sample container carrier of FIG. 1 according to an embodiment of the present disclosure.
Figure 3:
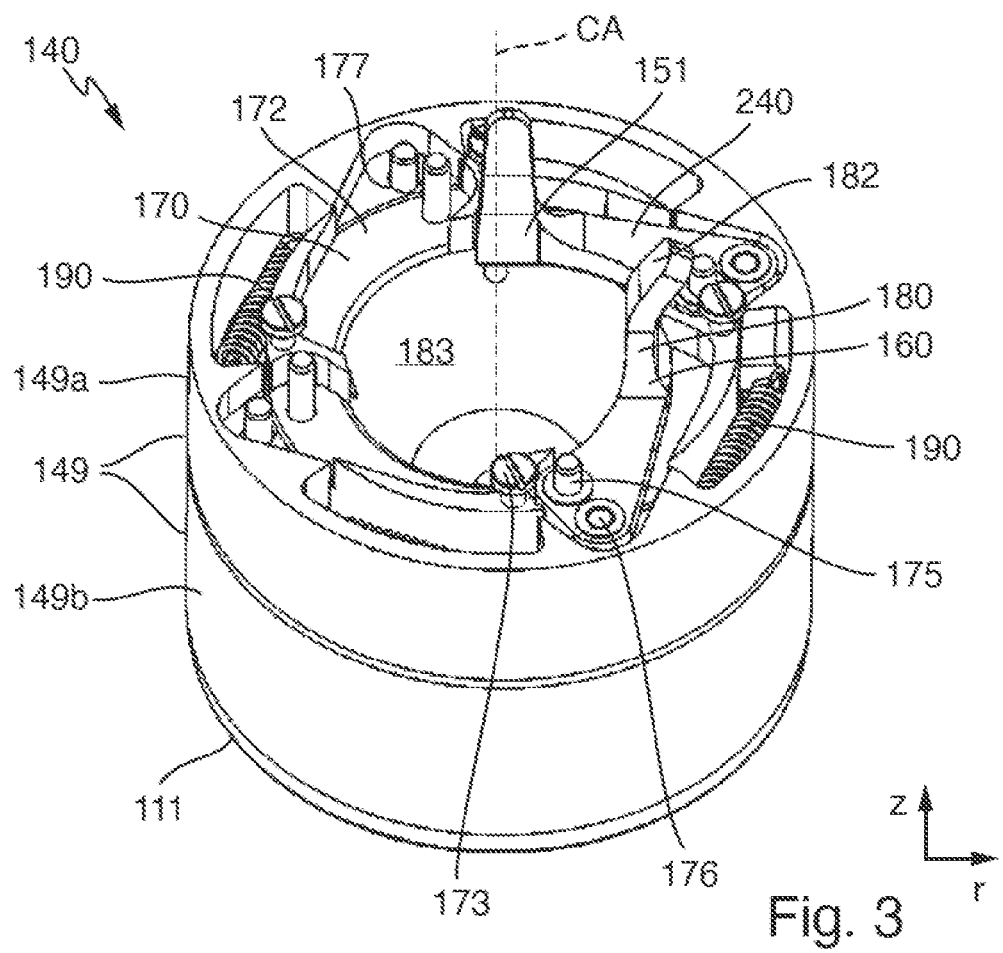
FIG. 3 illustrates another perspective view of the sample container carrier of FIG. 1 without an outside top cover and without two holding elements according to an embodiment of the present disclosure.

In the shown embodiment, the sample container carrier 140 can comprise a third holding element 151 and a fourth holding element 161. In alternative embodiments, the sample container carrier may comprise only two holding elements such as, for example, the first holding element and the second holding element. Further, in alternative embodiments, the sample container carrier may comprise three or more than four holding elements. In the shown embodiment, all of the holding elements 150, 151, 160, 161 can be rotationally displaceable towards and/or away from each other for holding the laboratory sample container 130, as shown in FIG. 2 by arrows P1, P2, P3, P4. The coupler 170 can be connected to all of the holding elements 150, 151, 160, 161 such that the coupler 170 can couple rotational displacements of all of the holding elements 150, 151, 160, 161 with each other.

Furthermore, in the shown embodiment, the coupler 170 can be a closed ring having a substantially circular shape.

In detail, the coupler 170 can comprise an outside top cover 171, in the shown embodiment, having a plate shape.

Additionally in the shown embodiment, the coupler 170 can comprise a bottom part 172. The outside top cover 171 can be arranged above such as, for example, along a central axis CA of the sample container carrier 140, of the bottom part 172. Moreover, the outside top cover 171 can be connected to the bottom part 172 by such as, for example, four, screws 173.

Further, the coupler 170 can be rotationally moveable such that the coupler 170 can couple by its rotational movement the rotational displacements of the first holding element 150 and the second holding element 160 and, in the shown embodiment, of the third holding element 151 and the fourth holding element 161, with each other, as shown in FIG. 2 by arrow P5. In the shown embodiment, the coupler 170 can be rotationally moveable around the central axis CA of the sample container carrier 140.

Furthermore, the sample container carrier 140 can comprise a base body 149, in the shown embodiment, having a cylindrical circular shape. The coupler 170 can be rotationally moveable and translationally fixed mounted to the base body 149. In the shown embodiment, the coupler 170 such as, for example, the bottom part 172, can be mounted to the base body 149 by a ball bearing 174. Moreover, the rotational movement of the coupler 170 can be guided by the base body 149 and by the ball bearing 174. In one embodiment, the coupler 170 such as, for example, the bottom part 172, can be arranged within or radially inward of the base body 149 and of the ball bearing 174 such as, for example, to the central axis CA. In other words, the base body 149 and the ball bearing 174 can surround the coupler 170 such as, for example, the bottom part 172.

Figure 4:
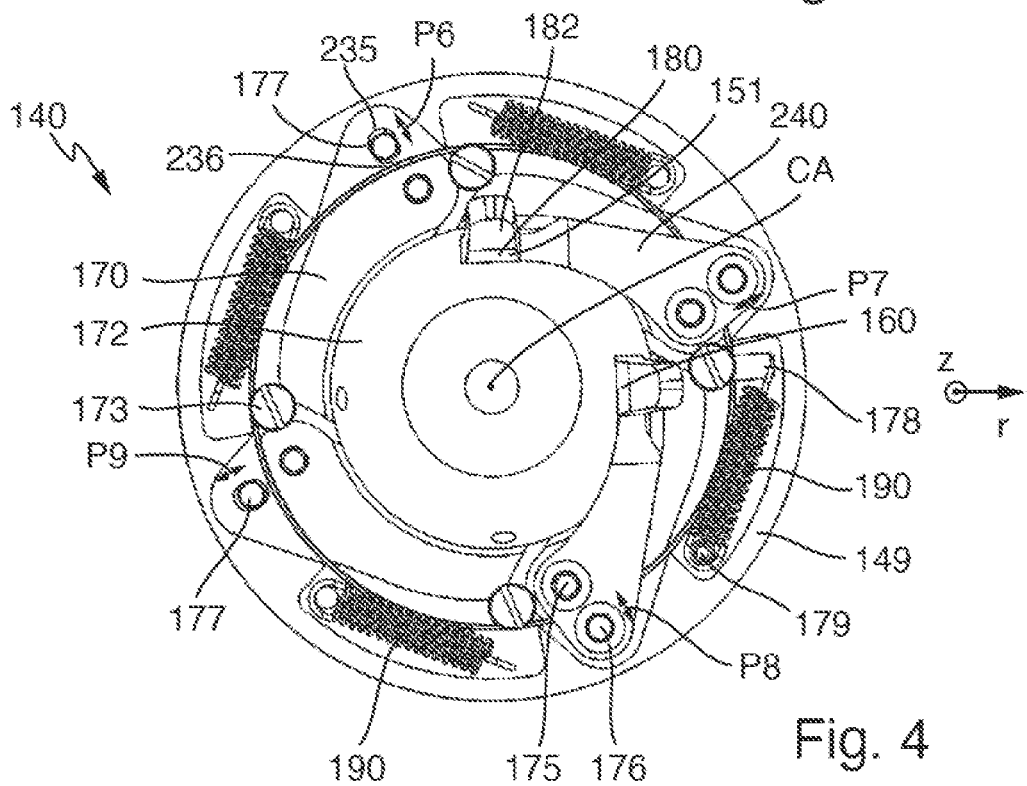
FIG. 4 illustrates another top view of the sample container carrier of FIG. 1 without an outside top cover and without two holding elements according to an embodiment of the present disclosure.
Figure 5:
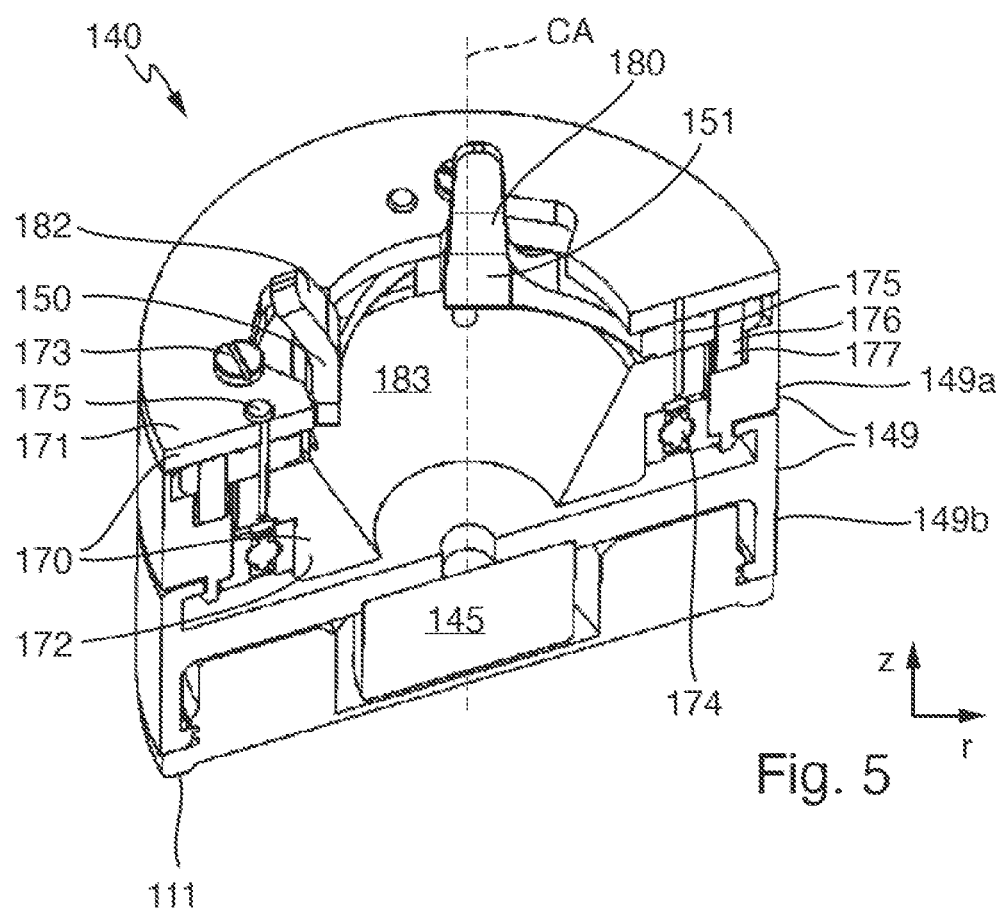
FIG. 5 illustrates a cross section view of the sample container carrier of FIG. 1 according to an embodiment of the present disclosure.
Figure 6:
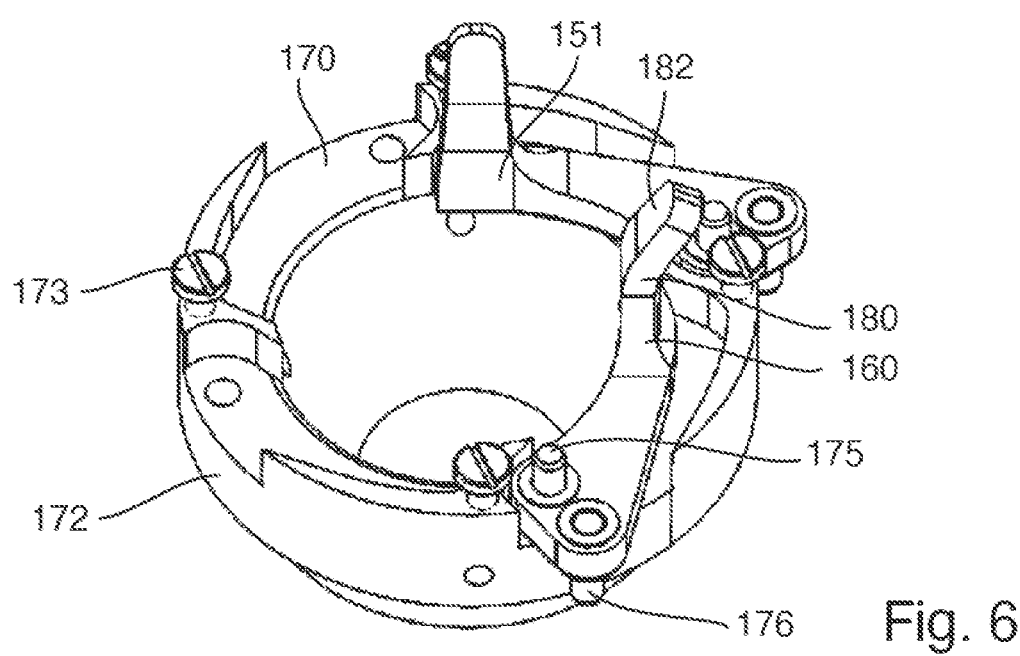
FIG. 6 illustrates a perspective view of two holding elements and a coupler of the sample container carrier of FIG. 1 without an outside top cover according to an embodiment of the present disclosure.

Moreover, in the shown embodiment, the first holding element 150 and the second holding element 160 and, in the shown embodiment, the third holding element 151 and the fourth holding element 161, can be rotationally moveable and translationally fixed mounted to the coupler 170 such as, for example, to the outside top cover 171 and the bottom part 172 such as, for example by four pins 175. Further, the first holding element 150 and the second holding element 160 and, in the shown embodiment, the third holding element 151 and the fourth holding element 161, can be rotationally moveable and translationally moveable guided mounted to the base body 149 such as, for example, by four, pins 176, as shown in FIG. 4 by arrows P6, P7, P8, P9.

In alternative embodiments, the first holding element and/or the second holding element and/or the third holding element and/or the fourth holding element may be rotationally moveable and translationally fixed mounted to the base body and rotationally moveable and translationally moveable guided mounted to the coupler.

In the shown embodiment, the base body 149 can comprise a number of guiding grooves 177 such as, for example, four. The number of guiding grooves 177 can be configured to guide the translational movements of the first holding element 150 and the second holding element 160 and, in the shown embodiment, the third holding element 151 and the fourth holding element 161 by the pins 176.

In alternative embodiments, the first holding element and/or the second holding element, the base body, and/or the coupler may comprise the number of guiding grooves.

In detail, a distance between each of the pins 175 and the another pins 176 can be constant. Furthermore, the number of pins 176 can be configured to cooperate together with the number of guiding grooves 177 for the translational movements. In one embodiment, the number of pins 176 can be partially arranged such as, for example, translationally moveable guided arranged, within the number of guiding grooves 177. Additionally, a direction of each of the number of guiding grooves 177 can be substantially orthogonal to a rotational movement direction of the coupler 170 and/or to the central axis CA and/or radially towards the central axis CA.

Furthermore, the coupler 170 can be rotationally moveable mounted to the base body 149 and the first holding element 150 and the second holding element 160 and, in the shown embodiment, the third holding element 151 and the fourth holding element 161 can be rotationally movable mounted to the base body 149 and the coupler 170 such that the first holding element 150 and the seconding holding element 160 and, in the shown embodiment, the third holding element 151 and the fourth holding element 161 such that, for example, each form a lever arm 240.

In detail, the pins 175, 176 and the guiding grooves 177 can be configured to transmit the rotational displacements of the first holding element 150 and the second holding element 160 and, in the shown embodiment, the third holding element 151 and the fourth holding element 161 into the rotational movement of the coupler 170. Moreover, the pins 175, 176 and the guiding grooves 177 can be configured to transmit the rotational movement of the coupler 170 into the rotational displacements of the first holding element 150 and the second holding element 160 and, in the shown embodiment, the third holding element 151 and the fourth holding element 161. In one embodiment, the rotational displacements of the first holding element 150 and the second holding element 160 and, in the shown embodiment, the third holding element 151 and the fourth holding element 161 away from each other and/or away from the central axis CA together with the guiding grooves 177 can cause the translational movements of the pins 176 radially inwards and/or towards the central axis CA and therewith the rotational movement of the coupler 170 around the central axis CA counter-clockwise. Further, the rotational movement of the coupler 170 around the central axis CA clockwise together with the guiding grooves 177 can cause the translational movements of the pins 176 radially outwards and/or away from the central axis CA and therewith the rotational displacements of the first holding element 150 and the second holding element 160 and, in the shown embodiment, the third holding element 151 and the fourth holding element 161 towards each other and/or towards the central axis CA.

In the shown embodiment, the first holding element 150 and the second holding element 160 and, in the shown embodiment, the third holding element 151 and the fourth holding element 161 such as, for example, the lever arm 240, can be arranged in between the outside top cover 171 and the bottom part 172 such as, for example, along the central axis CA.

Furthermore, the first holding element 150 and the second holding element 160 and, in the shown embodiment, the third holding element 151 and the fourth holding element 161 can be mounted to the base body 149 further radially outward to the coupler 170 such as, for example, from the central axis CA.

Moreover, the first holding element 150 and the second holding element 160 and, in the shown embodiment, the third holding element 151 and the fourth holding element 161 can comprise a number of jaws 180 such as, for example, four, for holding the laboratory sample container 130. In the shown embodiment, each holding element 150, 151, 160, 161 can comprise only one jaw 180. In alternative embodiments, at least one of the holding elements may comprise two, three, or more than three jaws.

In detail, the jaws 180 can be distributed around the central axis CA in an equidistant and equiangular manner. In the shown embodiment, an angle between the four jaws 180 can be about 90 degrees.

Further, the jaws 180 can be configured to be in direct contact with the laboratory sample container 130. In one embodiment, the holding elements 150, 151, 160, 161 and their jaws 180, respectively, can be arranged in a symmetric manner around the central axis CA of the sample container carrier 140 such that a point, or line, of contact of each of the holding elements 150, 151, 160, 161 with the laboratory sample container 130 can be equidistant from the central axis CA.

Furthermore, the coupler 170 such as, for example, the bottom part 172, can be tapered in an insertion direction −z for supporting the inserted laboratory sample container 130.

In other words, the coupler 170 such as, for example, the bottom part 172, can limit an insertion depth of the laboratory sample container 130.

In detail, the coupler 170 such as, for example, the bottom part 172, can be configured to be in direct contact with the laboratory sample container 130 for supporting the inserted laboratory sample container 130. In one embodiment, the coupler 170 such as, for example, the bottom part 172, can be arranged in a symmetric manner around the central axis CA of the sample container carrier 140 such that a point, or line, of contact of the coupler 170 such as, for example, the bottom part 172, with the laboratory sample container 130 can be equidistant from the central axis CA.

Moreover, the holding elements 150, 151, 160, 161 and their jaws 180, respectively, and the coupler 170 such as, for example, the bottom part 172, can define a holding region 183 for the laboratory sample container 130.

Further, the laboratory sample container 130 can be designed as a tube having an opening at an upper end, as shown in FIGS. 7 and 8. An end face of the held laboratory sample container 130 can be supported by the coupler 170 such as, for example, the bottom part 172. The jaws 180 can hold, or clamp, the laboratory sample container 130 at its circumference. The opening of the held laboratory sample container 130 can be facing away from the sample container carrier 140 and its coupler 170 such as, for example, the bottom part 172, respectively.

Furthermore, the holding elements 150, 151, 160, 161 and their jaws 180, respectively, can be configured to hold the laboratory sample container 130 such that a longitudinal axis of the laboratory sample container 130 in form of the tube can accord with the central axis CA. Moreover, the sample container carrier 140 can be configured to hold the laboratory sample container 130 such that the ring-shaped coupler 170 can surround the held laboratory sample container 130.

Further, a vertical length of the holding elements 150, 151, 160, 161 and their jaws 180, respectively, can be chosen such that a part of the circumference of the laboratory sample container 130 is not covered by it/them. In other words, the part of the circumference can be visible from the outside. In one embodiment, a value of the length can be in the region of about 10 millimeter (mm) to about 40 mm and, in another embodiment, can be about 15 mm. For example, the laboratory sample container 130 may comprise a barcode at its circumference that should be kept visible when the laboratory sample container 130 is held by the sample container carrier 140.

Furthermore, the lever arm 240 can comprise a curved shape. The jaw 180 can be arranged at an end portion of the lever arm 240 such that the lever arm 240 is not in contact with the laboratory sample container 130 when the laboratory sample container 130 is inserted into, held by, and/or removed from the sample container carrier 140.

Moreover, the first holding element 150 and the second holding element 160 and, in the shown embodiment, the third holding element 151 and the fourth holding element 161 and their jaws 180, respectively, can each comprise an insertion support 182. Each of the insertion supports 182 can be configured to cooperate together with the laboratory sample container 130 to be held such that the holding element 150, 151, 160, 161 comprising the insertion support 182 can be rotationally displaced when the laboratory sample container 130 is inserted into the sample container carrier 140 such as, for example, into the coupler 170. In the shown embodiment, each insertion support 182 can be an inclined plane. In detail, each insertion support 182 can be facing towards the central axis CA. An angle between the central axis CA and a respective insertion support 182 may be in the range of about 5 degrees to about 45 degrees.

Further, the sample container carrier 140 can comprise a retaining element 190 such as, for example, four retaining elements 190, applying a force to the coupler 170 such that the first holding element 150 and the second holding element 160 and, in the shown embodiment, the third holding element 151 and the fourth holding element 161 can be force-loaded towards each other for holding the laboratory sample container 130. In alternative embodiments, at least one retaining element may apply a force to the first holding element and/or to the second holding element and/or to the coupler.

In the shown embodiment, the at least one retaining element 190 can be mounted to the coupler 170 and the base body 149. In detail, the coupler 170 can comprise a coupler protrusion 178 such as, for example, four coupler protrusions 178, and the base body 149 can comprise a base body protrusion 179 such as, for example, four base body protrusions 179. The at least one retaining element 190 can be mounted to the coupler protrusion 178 and to the base body protrusion 179.

Furthermore, the at least one retaining element 190 can be an elastic element in the form of a spring such as, for example, in the form of a coil spring.

Moreover, the at least one retaining element 190 can be arranged radially outward of the coupler 170 such as, for example, from the central axis CA.

Additionally, the at least one retaining element 190 can apply a force such that the holding elements 150, 151, 160, 161 can be rotationally displaced towards each other such as, for example, into a default position when the laboratory sample container 130 is removed from the sample container carrier 140.

Further, the sample container carrier 140 can comprise a stop element 235, 236 such as, for example, eight stop elements 235, 236. At least one stop element 235, 236 can be configured to cooperate with the first holding element 150 and the second holding element 160 and, in the shown embodiment, the third holding element 151 and the fourth holding element 161 such as, for example, with the pins 176, such that the rotational displacements of the first holding element 150 and the second holding element 160 and, in the shown embodiment, the third holding element 151 and the fourth holding element 161 can be limited. In alternative embodiments, the at least one stop element may be configured to cooperate with the first holding element and/or the second holding element and/or the coupler.

In detail, the at least one stop element 235 can define the default position. In the shown embodiment, the at least one stop element 235 can be a radially outward end of the guiding groove 177. In the default position, at least one pin 176 can contact the at least one stop element 235 such that a further translational movement of the pin 176 can be blocked.

Furthermore, in the default position, a distance between the jaws 180 can be smaller than a minimal diameter of the laboratory sample container 130 to be held. However, a distance between the upper ends of the insertion supports 182 can be larger than a maximal diameter of the laboratory sample container 130 to be held.

Moreover, the at least one stop element 236 can be configured to limit the rotational displacements of the holding elements 150, 151, 160, 161 and their jaws 180, respectively, when the holding elements 150, 151, 160, 161 are rotationally displaced away from each other. In the shown embodiment, the at least one stop element 236 can be a radially inward end of the guiding groove 177. Then, the at least one pin 176 can contact the at least one stop element 236 such that a further translational movement of the pin 176 can be blocked.

When the laboratory sample container 130 is inserted into the sample container carrier 140 such as, for example, into the coupler 170, towards the bottom part 172, the laboratory sample container 130 can contact at least one of the insertion supports 182 and cooperate with it. Thereby, the corresponding holding element 150, 151, 160, 161 and via the coupler 170, the other holding elements 150, 151, 160, 161 can be rotationally displaced away from each other out of the default position.

When the laboratory sample container 130 is present in the holding region 183 between the holding elements 150, 151, 160, 161 and their jaws 180, respectively, and supported by the coupler 170 such as, for example, the bottom part 172, the at least one retaining element 190 can push and/or pull the holding elements 150, 151, 160, 161 against the laboratory sample container 130. The coupler 170 can ensure that the holding elements 150, 151, 160, 161 apply similar or identical holding force values to the laboratory sample container 130.

Further, the sample container carrier 140 can comprise a magnetically active element 145 such as, in the shown embodiment, a permanent magnet. The magnetically active element 145 can be configured to interact with a magnetic field generated by a drive element 120 such that a driving force can be applied to the sample container carrier 140.

In detail, the magnetically active element 145 can be arranged within a cavity of the base body 149 such as, for example, in a bottom base body part 149b of the base body 149. Therewith, the magnetically active element 145 may not be translationally displaceable relative to the base body 149.

Furthermore, the sample container carrier 140 can comprise a sliding surface 111 at its underside. In detail, the base body 149 such as, for example, the bottom base body part 149b, can comprise a ring-shaped sliding surface 111.

In the shown embodiment, the base body 149 can comprise two base body parts 149a, 149 b. In detail, one of the base body parts can be a top base body part 149a and another one of the base body parts can be the bottom base body part 149b arranged along the central axis CA.

This two-part base body 149 can enable an easy assembly of the sample container carrier 140 such as, for example, of the holding elements 150, 151, 160, 161 and the coupler 170.

In the shown embodiment, the top base body part 149a and the bottom base body part 149b can be connected such as, for example, mechanically connected, to each other by a snap type connection. In alternative embodiments, the top base body part and the bottom base body part may be connected to each other by a different type of connection.

FIG. 7 shows a laboratory automation system 10. The laboratory automation system 10 can comprises a laboratory sample distribution system 100 and a number of laboratory stations 20, 25. The number of laboratory stations 20, 25 may comprise at least one pre-analytical, analytical and/or post-analytical station. In the shown embodiment, the laboratory stations 20, 25 can be arranged adjacent to the laboratory sample distribution system 100. Self-evidently, more than the two laboratory stations 20, 25 depicted in FIG. 7 may be comprised in the laboratory automation system 10.

The laboratory sample distribution system 100 can comprise a number of sample container carriers 140 as described above. Self-evidently, more than the three sample container carriers 140 depicted in FIG. 7 may be comprised in the laboratory sample distribution system 100. Moreover, the laboratory sample distribution system 100 can comprise a transport plane 110, a number of drive elements 120 and a control device 125. The transport plane 110 can be configured to support the number of sample container carriers 140. The number of drive elements 120 can be configured to move the number of sample container carriers 140 on the transport plane 110. The control device 125 can be configured to control the number of drive elements 120 such that the number of sample container carriers 140 can move on the transport plane along corresponding transport paths such that, for example, each of the sample container carriers 140 can move along an individual transport path simultaneously.

The laboratory sample distribution system 100 can be configured to distribute the number of sample container carriers 140 and/or the laboratory sample containers 130 between the laboratory stations 20, 25.

At least one of the laboratory stations 20, 25 may comprise or be a gripper station for inserting the laboratory sample container 130 to the sample container carrier 140 or for removing the laboratory sample container 130 from the sample container carrier 140.

In detail, the number of drive elements 120 can comprise a number of electro-magnetic actuators 121. The number of electro-magnetic actuators 121 can be stationary arranged below the transport plane 110 and can be configured to generate a magnetic field to move the number of sample container carriers 140 on the transport plane 110.

In the shown embodiment, the electro-magnetic actuators 121 can be solenoids surrounding ferromagnetic cores. The electro-magnetic actuators 121 can be quadratically arranged in a grid having rows and columns such as, for example, in a plane substantially parallel to the transport plane 110. In each center of a quadrat formed by corresponding electro-magnetic actuators 121, no electro-magnetic actuator may be arranged. In other words, in each second row and in each second position, there may not be an electro-magnetic actuator 120.

The magnetically active element 145 of a respective sample container carrier 140 can be configured to interact with the magnetic field generated by the number of electro-magnetic actuators 121 such that a magnetic driving force can be applied to the sample container carrier 140.

The control device 125 can be configured to control the number of electro-magnetic actuators 121 such that the number of sample container carriers 140 can move on the transport plane along corresponding transport paths.

In detail, the electro-magnetic actuators 121 can be driven individually such as, for example, by the control device 125, in order to generate a magnetic field for each sample container carrier 140. The magnetic field can interact with the magnetically active device 145 of the sample container carriers 140. As a result of the interaction, the magnetic driving force can be applied to the sample container carrier 140. Hence, the sample container carriers 140 can be translationally moved in two dimensions x, y being substantially orthogonal to each other on or over the transport plane 110. In the shown embodiment, the sliding surface 111 of a respective sample container carrier 140 can be configured to be in contact with the transport plane 110 and can enable performing movements such as, for example, slides, of the sample container carrier 140 on the transport plane 110.

Further, the laboratory sample distribution system 100 can comprise a number of Hall-sensors 141. The number of Hall-sensors 141 can be arranged such that a position of a respective sample container carrier 140 on the transport plane 110 can be detected. The control device 125 can be functionally coupled to the Hall-sensors 141 for detecting the position of the sample container carrier 140. The control device 125 can be configured to control the electro-magnetic actuators 121 in response to the detected position.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A sample container carrier for holding a laboratory sample container and for transporting the held laboratory sample container in a laboratory sample distribution system, the sample container carrier comprising:
    a first holding element;
    a second holding element, wherein the first holding element and the second holding element are rotationally displaceable towards and away from each other for holding the laboratory sample container and horizontally displaceable orthogonal to a symmetrical central axis of the sample container carrier; and
    a coupler that is rotationally moveable around the central axis of the sample container carrier and is connected to the first holding element and to the second holding element such that the coupler couples by its rotational movement the rotational displacements of the first holding element and the second holding element with each other and wherein the coupler comprises a ring-segment shape and a bottom part that cooperate with one another to define a holding region such that upon insertion of the laboratory sample container therein, the laboratory sample container is at least partially positioned within the holding region of the coupler to be surrounded thereby, wherein each of the first holding element and the second holding element are mounted to the coupler by a pin and to a base body by another pin, wherein the coupler is rotationally moveable and translationally fixed relative to the base body while the first holding element and the second holding element comprise a jaw with insertion support for holding the laboratory sample container upon rotational displacement of the first holding element and the second holding element, the first holding element and the second holding element being rotationally moveable relative to the coupler and the base body and either:
    (i) translationally moveable relative to the base body such that the first holding element and the second holding element form a lever arm, or
    (ii) translationally fixed relative to the base body and translationally moveable relative to the coupler.

2. The sample container carrier according to claim 1, wherein the first holding element and the second holding element, the base body or the coupler comprise a plurality of guiding grooves and wherein the plurality of guiding grooves is configured to guide the translational movement of at least one of the first holding element and the second holding element.

3. The sample container carrier according to claim 1, wherein the first holding element and the second holding element are moveably secured to at least one of the base body and the coupler through a hinged connection to form the lever arm.

4. The sample container carrier according to claim 3, wherein the first holding element and the second holding element are mounted to the base body farther outward of the coupler.

5. The sample container carrier according to claim 3, wherein the coupler is tapered in an insertion direction (−z) for supporting the inserted laboratory sample container.

6. The sample container carrier according to claim 3, wherein the first holding element and the second holding element comprise a plurality of jaws for holding the laboratory sample container.

7. The sample container carrier according to claim 6, wherein each lever arm comprises a curved shape and wherein each jaw of the plurality of jaws is arranged at each lever arm such that each lever arm is not in contact with the laboratory sample container when the laboratory sample container is inserted into, held by or removed from the sample container carrier.

8. The sample container carrier according to claim 1, further comprising a retaining element applying a force to at least one of the first holding element, the second holding element and the coupler such that the first holding element and the second holding element are force-loaded towards each other for holding the laboratory sample container.

9. The sample container carrier according to claim 1, wherein the coupler comprises an outside top cover.

10. The sample container carrier according to claim 1, further comprising a magnetically active element, wherein the magnetically active element is configured to interact with a magnetic field generated by a drive element such that a driving force is applied to the sample container carrier.

11. A laboratory sample distribution system, the laboratory sample distribution system comprising:
    a plurality of sample container carriers according to claim 1;
    a transport plane, wherein the transport plane is configured to support the plurality of sample container carriers;
    a plurality of drive elements, wherein the plurality of drive elements is configured to move the plurality of sample container carriers on the transport plane; and
    a control device, wherein the control device is configured to control the plurality of drive elements such that the plurality of sample container carriers moves on the transport plane along corresponding transport paths.

12. The laboratory sample distribution system according to claim 11, wherein the plurality of drive elements comprises a plurality of electro-magnetic actuators and wherein the plurality of electro-magnetic actuators is stationary arranged below the transport plane and is configured to generate a magnetic field to move the plurality of sample container carriers on the transport plane.

13. The laboratory sample distribution system according to claim 12, wherein each of the plurality of sample container carriers comprises a magnetically active element and wherein the magnetically active element is configured to interact with the magnetic field generated by the plurality of electro-magnetic actuators such that a driving force is applied to the sample container carrier.

14. The laboratory sample distribution system according to claim 12, wherein the control device is configured to control the plurality of electro-magnetic actuators such that the plurality of sample container carriers moves on the transport plane along corresponding transport paths.

15. A laboratory automation system, the laboratory automation system comprising:
 a plurality of laboratory stations; and
 a laboratory sample distribution system according to claim 11, wherein the laboratory sample distribution system is configured to distribute the plurality of sample container carriers and laboratory sample containers between the laboratory stations.

16. The sample container carrier according to claim 1, whereupon insertion of the laboratory sample container into the holding region, the bottom part of the coupler is in direct contact with the bottom of the laboratory sample container to limit an insertion depth of the laboratory sample container into the holding region.

* * * * *